(12) United States Patent
Hansen

(10) Patent No.: US 8,185,424 B2
(45) Date of Patent: May 22, 2012

(54) SOFT SKILLS JOB MATCHING SYSTEM AND METHOD

(76) Inventor: Carol J. Hansen, San Jose, CA (US)

( * ) Notice: Subject to any disclaimer, the term of this patent is extended or adjusted under 35 U.S.C. 154(b) by 923 days.

(21) Appl. No.: 12/209,141

(22) Filed: Sep. 11, 2008

(65) Prior Publication Data

US 2009/0043636 A1 Feb. 12, 2009

Related U.S. Application Data

(62) Division of application No. 10/777,546, filed on Feb. 12, 2004.

(60) Provisional application No. 60/447,102, filed on Feb. 13, 2003.

(51) Int. Cl.
*G06F 9/46* (2006.01)

(52) U.S. Cl. .................................... 705/7.14
(58) Field of Classification Search ................ 705/7.14
See application file for complete search history.

(56) References Cited

U.S. PATENT DOCUMENTS

| | | | | |
|---|---|---|---|---|
| 5,551,880 A * | 9/1996 | Bonnstetter et al. | ......... | 434/236 |
| 5,978,768 A * | 11/1999 | McGovern et al. | ......... | 705/321 |
| 6,249,282 B1 * | 6/2001 | Sutcliffe et al. | ............ | 715/751 |
| 6,385,620 B1 * | 5/2002 | Kurzius et al. | ......... | 1/1 |
| 7,191,138 B1 * | 3/2007 | Roy et al. | ............ | 705/321 |
| 7,310,626 B2 * | 12/2007 | Scarborough et al. | ......... | 706/60 |
| 7,321,858 B2 * | 1/2008 | Andino et al. | ................. | 705/12 |
| 7,502,748 B1 * | 3/2009 | Baldwin et al. | ............ | 705/7.14 |
| 2001/0034630 A1 | 10/2001 | Mayer et al. | | |
| 2004/0054567 A1 * | 3/2004 | Bubner | .......................... | 705/7 |

OTHER PUBLICATIONS

Melamed, Tuvia and David Jackson. "Psychometric instruments: Potential benefits and practical use". Industrial and Commercial Training, Guilsborough: 1995. vol. 27, Iss. 4; p. 11.

* cited by examiner

*Primary Examiner* — Romain Jeanty
(74) *Attorney, Agent, or Firm* — Lisel M. Ferguson; Procopio, Cory, Hargreaves & Savitch, LLP

(57) ABSTRACT

This invention involves a method and system for assessing the match between jobseekers and jobs by using perceptual mapping techniques to ascertain the proper fit of employee to employer. The purpose of this system is to add additional important information to the job matching process to enhance the quality and efficiency of the hiring process. This system involves a soft skills job matching system and method of using the same. The system uses vector algebra to find the closest match of employee to employer.

3 Claims, 4 Drawing Sheets

|  |  | Extroversion | Knowledge | Confidence | Action |
|---|---|---|---|---|---|
|  |  | 27% of Variance | 18% of Variance | 13% of variance | 10% of variance |
| Vector1 | Power | -0.43 | 0.207 | 0.571 | -0.294 |
| Vector2 | Achievement | 0 | -0.234 | 0.497 | 0.442 |
| Vector3 | Affiliation | 0.818 | 0.254 | -0.273 | 0 |
| Vector4 | Excitement | 0 | 0.11 | 0 | 0.885 |
| Vector5 | Involvement | 0.485 | 0.44 | -0.481 | 0 |
| Vector6 | Confidence | -0.102 | 0.176 | 0.839 | 0 |
| Vector7 | Extroversion | 0.841 | 0 | 0 | 0 |
| Vector8 | Introversion | -0.606 | -0.176 | 0.155 | 0.462 |
| Vector9 | Independence | -0.9 | 0 | 0 | 0 |
| Vector10 | Process | 0 | -0.807 | 0 | -0.105 |
| Vector11 | Content | 0 | 0.793 | 0 | -0.102 |
| Vector12 | Desire for leadership | 0.356 | 0.637 | 0.306 | 0 |
| Vector13 | Communication | 0.602 | 0.499 | -0.192 | -0.229 |

FIG. 3

SOFT SKILLS JOB MATCHING SYSTEM AND METHOD

FIELD OF THE INVENTION

The present invention relates, in general, to a soft skills job matching system and a method of using the same. More particularly, the present invention relates to a system which is able to determine the right employee for the right job. This is a system and method wherein statistics involving perceptual mapping is used to determine the right employee for a job position.

BACKGROUND OF THE INVENTION

A number of employers expend extensive time and resources in an effort to find, evaluate and hire job seekers. Conversely, job seekers expend extensive time looking for, filing applications with and interviewing with potential employers. Many times these potential employers do not offer the job which fits the job seeker's qualifications or character. The standard method for obtaining employment includes sending cover letters, filling out resumes and interviewing. Employers are forced to look through numerous resumes and cover letters before they find a pool of job seekers to interview. These old style techniques involve committing employer and job seeker time and expense and still do not result in placing the right job seeker with a potential employer. Often times it is hard to ascertain a candidate's softskills match from an interview.

SUMMARY OF THE INVENTION

This invention involves a method and system for assessing the match between jobseekers and jobs by using perceptual mapping techniques to ascertain the proper fit of employee to employer. The purpose of this system is to add additional important information to the job matching process to enhance the quality and efficiency of the hiring process. This will help clients make better matches, increase productivity of workers and increase the likelihood that the new employee will stay longer. The system uses vector algebra to find the closest match of employee to employer.

Two mathematical tools are used to classify jobs and applicants, Factor Analysis and Perceptual Mapping. Perceptual mapping reveals structure of how people think about complex topics and begins with a broad range of unstructured information (database of responses), then uses advanced statistical analysis to—discern the structure of the information, shed light on the strength of perceptions, and provide insights into topics that are deeply held but not vocalized. A factor analysis is performed to discern the mindsets—the ways people think about the topic, and a cluster analysis is performed to determine whether people fall into distinct groups based on the mindsets.

The system is based on a set of 13 workplace attributes (preference metrics) that characterize a job or an applicant applying for a job. These thirteen traits capture things like the degree of power, achievement, affiliation and excitement process, communication, achievement, involvement, introversion, content, affiliation, confidence, independence, and desire for leadership. The tool captures these attributes by posing statements to the employer and the application. The 13 traits sought are reflected in 39 statement pairs. The employee and employer are asked to choose between two pairs of statements randomly paired by the computer which reduces the possibility of gaming the system. Each statement contributes to several of the 13 attributes. Each time a respondent chooses between the two statements, the system translates the choice and adjusts the weights applied to the preference metrics. When the respondent completes the questionnaire, the result is a 13-dimensional vector composed of the preference metrics. These metrics are measured indirectly. Each individual has a preference vector, essentially 13 numbers that indicate their preference in each preference metric (attribute). Each job posted also has a preference vector, that indicates the hiring manager's preference for a person who might fit in well. Finding the smallest vector difference with vector algebra between the employer's and the applicant's vector preferences ensures the best match. And this process along with the match of hard tech skills, would be all that is required if feedback to the participants were not required. Rendering the underlying mathematics pictorially requires the creation of two classification types: mindsets and work place preferencers. We start with mindsets. Mindsets say something about an employer or applicant's mindset orientation. It consists of groupings into one of four types: extroversion, knowledge, confidence or action. To arrive at any one of these mindsets, the 13 point vector preference obtained from the questionnaire need to be transformed using a mathematical technique called Factor Analysis. The 13 point preference vectors are then factored to four distinct mindsets by correlation.

The four mindset types are derived from a pre-established known pool of individuals who exemplify these orientations. Factor Analysis is the mathematical method of correlating the 13 numbers of an employer or applicant vector to one of these 4 mindset types. Correlating a 13 point vector to one of four mindset types reveals useful information about the individual from the perspective of either the employer or the applicant, but it does not picture a "fit" within a working group. To accomplish this next correlation, the tool employs a mathematical technique known as Perceptual Mapping. Using this technique 13 point preference vectors, pictured as mindsets are finally transformed into preferences for work within a group. We call these groupings work place preferences; they consist of action seekers, do the work (heavy lifters), team spirit and leaders.

The system is robust, statistical analysis has been run on the system and it shows strong internal consistency. The statistical analysis run on the system also displays how the soft skills matching improves the quality and efficiency of the matching job candidates with the right job. For example, when one jobseeker is evaluated for two positions with very similar technical skill requirements, the results can be quite different-often an excellent match for one position is a very poor match for another position, just based on the hard technical soft skills evaluation. The system is very valuable in that it provides excellent insight into the unmet needs of employees and employers, by picturing to the needs of the four workplace preference groups, it greatly enhances the effectiveness, and understanding of the match between employee and employer.

For the employers, the system ranks for the employers, the job seekers by highest percentage of overall fit according to how well they match the hard technical skills and soft skills profile. For the job seeker the system does a similar ranking of job openings that fit its hard and soft skill profiles. In addition, the employer and applicant will have the opportunity to "see" how the potential jobseekers match in specific areas of the soft skills psychometric profile, including the 13 attributes, mindset orientation and workplace preference. This invention replaces the inefficient flow of resumes into a company. The use of this invention further can reduce the jobseeker turnover by matching employee to the employer, by more than hard technical skills, more than psychometric mindset orientations; it goes one step farther including work place preference matching to achieve work group balance and a more proficient working environment.

BRIEF DESCRIPTION OF THE DRAWINGS

The accompanying figures, which are incorporated in and constitute a part of the specification, illustrate embodiments of the invention and, together with the description, serve to explain the objects, advantages, and principles of the invention. In the figures:

FIG. 3 is a table which shows what values of each of the thirteen attributes make up the mindsets.

DETAILED DESCRIPTION OF PREFERRED EMBODIMENTS

After reading this description, it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Figure 1:
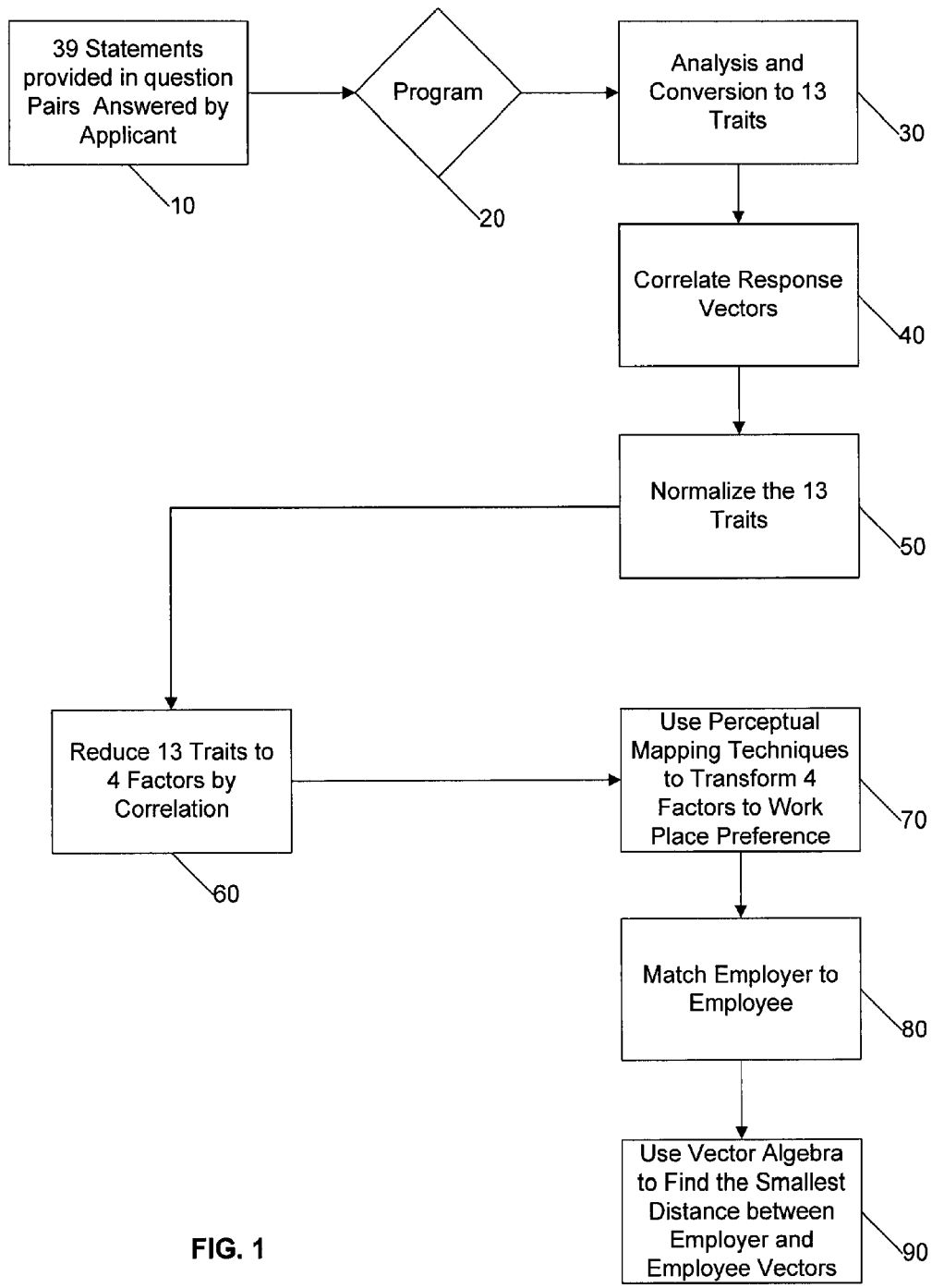
FIG. 1 is a flow diagram which shows the main steps of the system.

With reference to FIG. 1, a flow diagram showing the main steps of the system is displayed. First either a potential employee applying for a job or an employer looking to fill a specific position is presented with question pairs taken from a set of 39 questions at step 10. These questions are statements relating to workplace attributes and the individual or employer is asked to choose which best describes them or the position. If the question pair is answered in the affirmative a value of one is assigned. If the question pair is answered in the negative a zero value is assigned. A given pair question must be answered in the affirmative twice (at different instances) to be rated affirmatively. The answers from the applicant or employer are fed into a program at 20. At step 20 the program analyzes the question pairs asked and the answers received and converts these values into 13 attribute values at step 30. The program analysis will be explained in more detail at FIG. 2.

After the 13 attribute values are determined the system correlates the 13 point vector values to the mean and standard deviation of a known pool of pre-established, control individuals. This correlation mathematically normalizes the 13 point vectors to a scale consistent with the control group. Subsequently, the normalized 13 point vector is reclassified using a mathematical technique called Factor Analysis at Step 50, into one of the four mindset types (extroversion, knowledge, confidence or action) pre-established by the underlying control population. The formulas for these transformations are set forth below. The underlying population studies included a group of 246 persons with known mindsets. These mindsets included extroversion, knowledge, confidence, or action. This large pool of applicants was tested with the system to obtain baseline values for the Factor Analysis rules to be used on employers of future applicants.

At step 60 the program reduces the thirteen attributes to four mindset factors by mindset correlation. The body of knowledge utilized to convert the thirteen attributes to four factors is called factor analysis, which reduces the thirteen attributes into four scalar values. At step 70 further transformation occurs using perceptual mapping techniques. In this instance the four revealed mindsets are transformed into one of four workplace preferences. At step 80 the employer is matched to employees. At step 90 vector algebra is utilized to find the smallest distance between the employer's vector and the employee's vector to determine which employee and employer have the closest match.

Figure 2:
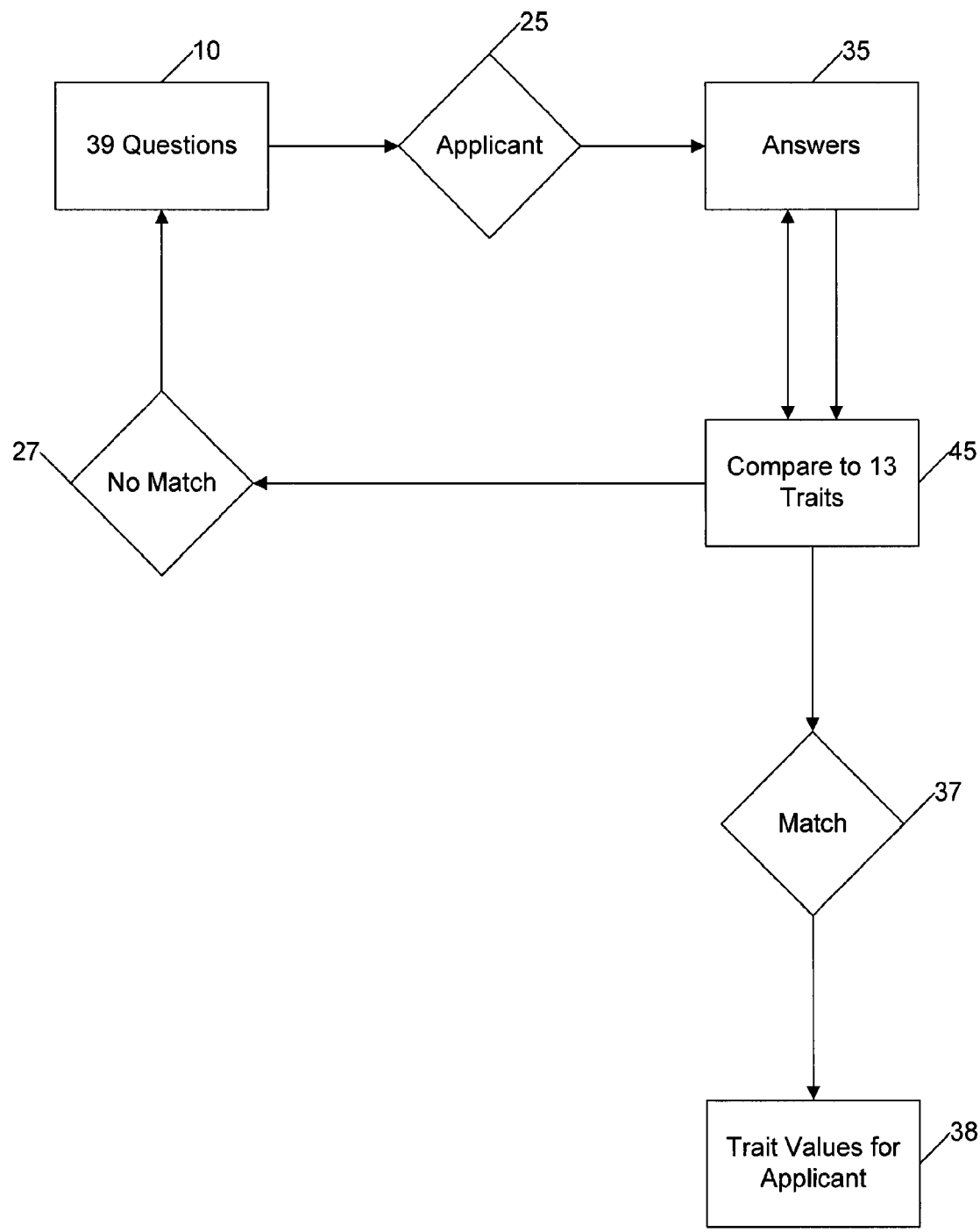
FIG. 2 is a flow diagram showing how the questions asked of an employee or employer are converted to 13 attributes.

FIG. 2 is flow diagram showing how the questions asked of an employee or employer are converted to 13 attributes. At step 10 there is a pool of thirty-nine (39) questions, which are asked to the applicant 25 in various pair combinations. The applicant 25 answers these question pairs at 35 and the answers are classified by the system in either the affirmative or the negative. The answers are then compared to a pool of the thirteen attributes at step 45. This system relies on a loading matrix that ties 39 statements to the thirteen attributes or vector scalars. The total number of combinations, the number of unique pairs that can be selected from these questions is ($n^2-n$) divided by 2, which equals 741 different unique pairs. These multiple numbers of possible pairs make it nearly impossible for a person to gain or reverse engineer the system. The 13-preference attributes include: power, excitement, extroversion, process, bistorts communication, achievement, involvement, introversion, content, affiliation, confidence, independence, and desire for leadership.

The questions are paired so that the respondent must choose between the two responses, both of which are positive, and could be reasonably preferred. This makes it difficult for the respondent to game the system by simply selecting the item perceived as preferred by the hiring manager. The 39 questions are asked in various combinations until a stable underlying pattern matches all 13 attributes. If an answer does not match an attribute at step 27, another pair of questions is asked at step 10 to the applicant 25 and additional answers 35 are received and compared to the attributes at step 45. This process continues until a match to each of the attributes is found at step 37. A match is found after all 13 attributes are tested twice. Step 37 of the program then passes this match on to step 38 where the attribute values for the applicant are determined. At step 38 the values are adjusted with the multiplication of the coefficient that takes into account the number of attempts the user has undergone to arrive at the concrete affirmative or negative response. Until all 13 attributes are tested twice.

The system classifies a positive response with a 1, a negative match with a 0. However a 13 point preference vector consists of components with values always less than 1. These fractional values result from coefficient multiplication. Here is how the coefficients are derived. If the response pair set for a specific attribute is identified on the first pass, the multiplication factor is set to 0.9. If the pair is not ascertained until the attempt number "n", the coefficient is set 1/n+0.35. So for example, two attempts at successful pair wise capture is ½+0.35=0.85. If the respondent needs five tries, ⅕+0.35=0.55. Ten tries might be someone confused or someone attempting to game the system. The result would be 1/10+0.35=0.45. At step 38 these attribute values are determined so that each attribute has a specific value. These attribute values are also referred to as scalars.

After the 13 attribute values or vector scalars are determined they are reduced to four scalar values through a body of knowledge referred to as Factor Analysis. First each individual's attribute value is combined with the attribute values of all other current applicant's individual's attribute values. This value is then compared to the attribute value determined through the population study for each of the four factors to arrive at a statistical mean and standard deviation. This mean and standard deviation is used to transform all attributes into a scale consistent with an underlying control group.

The resultant standardized scalars values, are now normalized and will have a mean and a standard deviation of 1. Mean for each scalar for all participants in the particular applicant pool=sum all scalar (i) of all participants divided by the number or participants. The equation used for the standard deviation is as follows:

$$\text{Std } x = (x - x\_\text{mean})/x\_\text{standard\_deviation and example would be std\_attribute1} = (\text{trat1} - 0.02460)/0.1168$$

This equation essentially normalizes the thirteen attributes using a consistent scale as is displayed in FIG. 1 step 50. Next these thirteen normalized attributes are converted to four factors by correlation as represented by FIG. 1 step 60. This is done by correlating individual or employer preferences to one of four mindset types. These mindset types include: action seekers, knowledge, confidence and extraversion. This correlation is done by the system through a formula which utilizes common values obtained from the initial population study. Each of the thirteen attributes has an assigned value for each factor which was obtained though the statistical analysis of the population study. Thus, though this initial population study equations were determined to normalize attribute values to factors.

The equations which have been determined to correlate the thirteen normalized attributes to factors are as follows:

$$\text{Factor 1} = -0.0820 * \text{std\_scalar1} + 0.1311 * \text{std\_scalar2} +$$
$$0.2263 * \text{std\_scalar3} - 0.0058 * \text{std\_scalar4} + 0.0122 * \text{std\_scalar5} +$$
$$0.1248 * \text{std\_scalar6} + 0.3192 * \text{std\_scalar7} - 0.1720 * \text{std\_scalar8} -$$
$$0.3607 * \text{std\_scalar9} + 0.1148 * \text{std\_scalar10} - 0.1254 * \text{std\_scalar11} +$$
$$0.1085 * \text{std\_scalar12} + 0.1118 * \text{std\_scalar13};$$

$$\text{Factor 2} = 0.1040 * \text{std\_scalar1} - 0.1211 * \text{std\_scalar2} +$$
$$0.0146 * \text{std\_scalar3} + 0.1113 * \text{std\_scalar4} + 0.1840 * \text{std\_scalar5} +$$
$$0.0314 * \text{std\_scalar6} - 0.0896 * \text{std\_scalar7} + 0.0293 * \text{std\_scalar8} +$$
$$0.1842 * \text{std\_scalar9} - 0.3991 * \text{std\_scalar10} + 0.3836 * \text{std\_scalar11} +$$
$$0.2279 * \text{std\_scalar12} + 0.1496 * \text{std\_scalar13};$$

$$\text{Factor 3} = 0.3003 * \text{std\_scalar1} - 0.3337 * \text{std\_scalar2} -$$
$$0.0274 * \text{std\_scalar3} + 0.0810 * \text{std\_scalar4} - 0.2709 * \text{std\_scalar5} +$$
$$0.5507 * \text{std\_scalar6} + 0.1679 * \text{std\_scalar7} - 0.0377 * \text{std\_scalar8} -$$
$$0.1569 * \text{std\_scalar9} + 0.0920 * \text{std\_scalar10} - 0.0244 * \text{std\_scalar11} +$$
$$0.2408 * \text{std\_scalar12} - 0.0308 * \text{std\_scalar13};$$

$$\text{Factor 4} = -0.2446 * \text{std\_scalar1} + 0.2927 * \text{std\_scalar2} +$$
$$0.0554 * \text{std\_scalar3} + 0.6769 * \text{std\_scalar4} + 0.0952 * \text{std\_scalar5} +$$
$$0.0175 * \text{std\_scalar6} + 0.0345 * \text{std\_scalar7} + 0.3185 * \text{std\_scalar8} -$$
$$0.0365 * \text{std\_scalar9} - 0.1329 * \text{std\_scalar10} -$$
$$0.0309 * \text{std\_scalar11} + 0.0301 * \text{std\_scalar12} - 0.1208 * \text{std\_scalar13}.$$

Referring to FIG. 3 a table is shown which displays the values for each of the different mind sets as compared to the 13 attributes. This table was derived through the population study which supports this system. The numbers in the darkest boxes are those that contribute most to each of the mind sets. The numbers in the lighter shaded boxes indicate items that contribute to the mind set, but are not primary drivers. As can be seen by viewing this table most of the mind sets, which include extraversion, knowledge, confidence, action, are composed of several preferences. For example extraversion is made up of a high loading on the attribute of affiliation, indicating the desire to be associated with others, and in negative loading on the attribute of independence. Interestingly, the single strongest loading is negative which is a negative 0.9 for the attribute independence. The combination of the various attribute values make up the particular mind sets. The mind sets are distinct yet interrelated ways that people use to think about their work preferences. One person can have elements of all the mind sets. It is the relative amounts of these mind sets that determines where an individual is on the map. The length of the vector determines the strength of the mind set.

Once the four factors have been determined through the equations above they are converted to work place preferences at FIG. 1 step 70. The methodology starts with geometrically rotating the mindset factors into a new grouping of work place preferences. Think of it as transforming from one coordinate system, say x-y into a new coordinate system, like polar coordinates. Fix values for the new work place preference system are derived from the same pre-established control population. The resulting math determines a new scale with class1, class2, class3 and class4 attributes as listed below. This new scale makes possible a different clustering of mindsets into work place preferences. Employer and applicant mindsets are now clustered into this new scale according to apparent similarities. Sometimes the similarities and differences are distinct enough to form apparent groups other times they are not. The following equations are used to describe the previous mindsets in terms of the new work place preference coordinates.

$$\text{Work place preference 1} = (\text{Fact1} - 0.2542)^2 +$$
$$(\text{Fact2} - 0.2494)^2 + (\text{Fact3} - 0.2420)^2 + (\text{Fact4} - 1.0024)^2;$$

$$\text{Work place preference 2} = (\text{Fact1} + 1.2788)^2 +$$
$$(\text{Fact2} + 0.9622)^2 + (\text{Fact3} + 0.5809)^2 + (\text{Fact4} - 0.0630)^2;$$

$$\text{Work place preference 3} = (\text{Fact1} - 0.7620)^2 +$$
$$(\text{Fact2} - 0.2275)^2 + (\text{Fact3} + 0.8443)^2 + (\text{Fact4} + 0.5390)^2;$$

$$\text{Work place preference 4} = (\text{Fact1} + 0.2334)^2 +$$
$$(\text{Fact2} - 0.1016)^2 + (\text{Fact3} - 0.9285)^2 + (\text{Fact4} + 0.6018)^2.$$

Now then, all that is left in order to identify the new cluster groupings which we call work place preferences, is to find for each individual's new class1, class2, class3 and class4 coordinates, the smallest amongst the four. If the min=class1, then group=1;→Action Seeker
If the min=class2, then group=2;→Leader
If the min=class3, then group=3;→Heavy Lifter
If the min=class4, then group=4.→Team Spirit.

Figure 4:
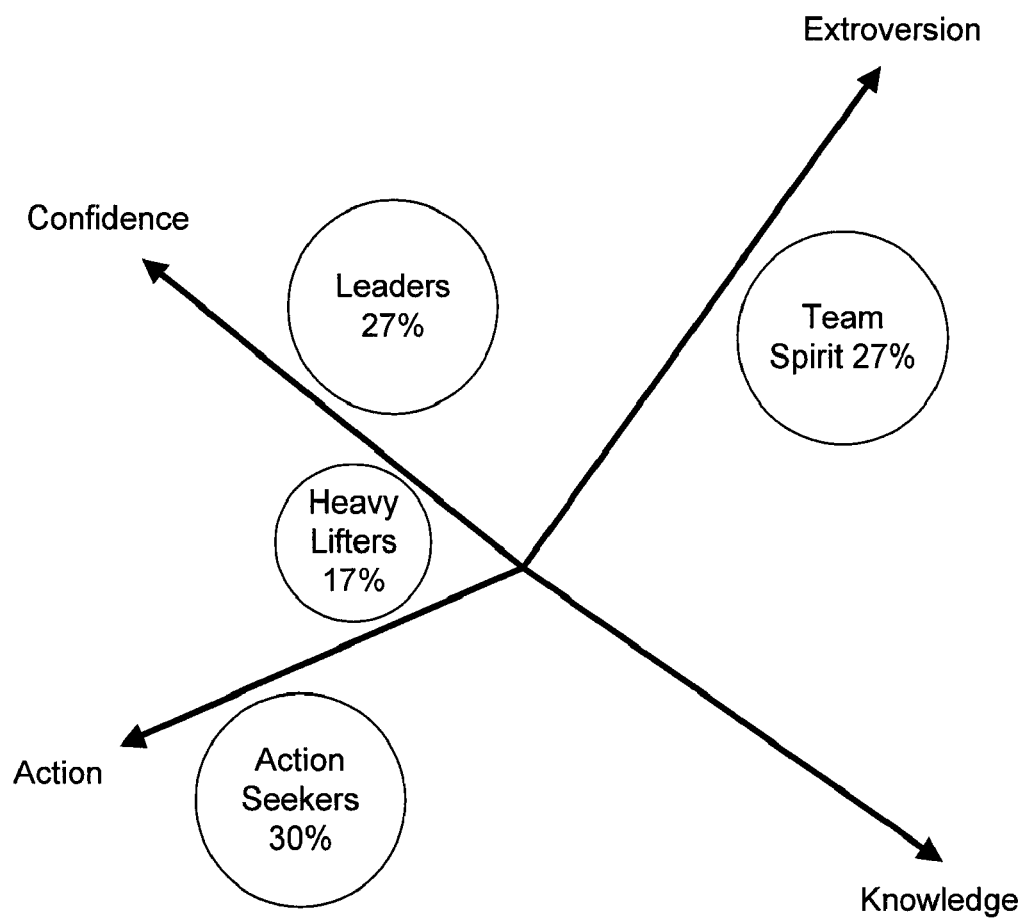
FIG. 4 is a figure showing the perceptual map of work preferences mapped on the four vectors.

FIG. 4 shows the perceptual map of the work preferences mapped onto the four vectors. FIG. 4 illustrates the four clusters in terms of mindsets. The size of the circle shows the relative percentage of the respondents in that cluster. These clusters show the dominant modes of peoples' workplace desires.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A job matching system comprising:
   a computer processor,
   a set of questions asked in pairs to a potential employee or employer; and
   a computer program which utilizes statistical formulas to analyze the answers received by the employee or employer,
   convert the answers received into 13 attributes,
   run a mean and standard deviation between all data points to achieve a consistent scale and normalize data,
   utilize a common ruler which is derived from testing a population of persons with known work place presences to achieve a consistent scale, wherein the common ruler uses the following equations:

$$\text{Factor 1} = -0.0820*\text{std\_scalar1} + 0.1311*\text{std\_scalar2} + 0.2263*\text{std\_scalar3} - 0.0058*\text{std\_scalar4} + 0.0122*\text{std\_scalar5} + 0.1248*\text{std\_scalar6} + 0.3192*\text{std\_scalar7} - 0.1720*\text{std\_scalar8} - 0.3607*\text{std\_scalar9} + 0.1148*\text{std\_scalar10} - 0.1254*\text{std\_scalar11} + 0.1085*\text{std\_scalar12} + 0.1118*\text{std\_scalar13};$$

$$\text{Factor 2} = 0.1040*\text{std\_scalar1} - 0.1211*\text{std\_scalar2} + 0.0146*\text{std\_scalar3} + 0.1113*\text{std\_scalar4} + 0.1840*\text{std\_scalar5} + 0.0314*\text{std\_scalar6} - 0.0896*\text{std\_scalar7} + 0.0293*\text{std\_scalar8} + 0.1842*\text{std\_scalar9} - 0.3991*\text{std\_scalar10} + 0.3836*\text{std\_scalar11} + 0.2279*\text{std\_scalar12} + 0.1496*\text{std\_scalar13};$$

$$\text{Factor 3} = 0.3003*\text{std\_scalar1} - 0.3337*\text{std\_scalar2} - 0.0274*\text{std\_scalar3} + 0.0810*\text{std\_scalar4} - 0.2709*\text{std\_scalar5} + 0.5507*\text{std\_scalar6} + 0.1679*\text{std\_scalar7} - 0.0377*\text{std\_scalar8} - 0.1569*\text{std\_scalar9} + 0.0920*\text{std\_scalar10} - 0.0244*\text{std\_scalar11} + 0.2408*\text{std\_scalar12} - 0.0308*\text{std\_scalar13};$$

$$\text{Factor 4} = -0.2446*\text{std\_scalar1} + 0.2927*\text{std\_scalar2} + 0.0554*\text{std\_scalar3} + 0.6769*\text{std\_scalar4} + 0.0952*\text{std\_scalar5} + 0.0175*\text{std\_scalar6} + 0.0345*\text{std\_scalar7} + 0.3185*\text{std\_scalar8} - 0.0365*\text{std\_scalar9} - 0.1329*\text{std\_scalar10} - 0.0309*\text{std\_scalar11} + 0.0301*\text{std\_scalar12} - 0.1208*\text{std\_scalar13},$$

utilize factor analysis to classify into mindsets,
   utilize perceptual mapping techniques to group the mindsets to one of four work place preferences displayed in vectors, and
   utilize vector algebra to find the smallest distances between the employee and employer vectors.

2. The system of claim 1, wherein the perceptual mapping techniques utilize the following formulas to transform the four factors to workplace preferences:

$$\text{Work place preference 1} = (\text{Fact1} - 0.2542)^2 + (\text{Fact2} - 0.2494)^2 + (\text{Fact3} - 0.2420)^2 + (\text{Fact4} - 1.0024)^2;$$

$$\text{Work place preference 2} = (\text{Fact1} + 1.2788)^2 + (\text{Fact2} + 0.9622)^2 + (\text{Fact3} + 0.5809)^2 + (\text{Fact4} - 0.0630)^2;$$

$$\text{Work place preference 3} = (\text{Fact1} - 0.7620)^2 + (\text{Fact2} - 0.2275)^2 + (\text{Fact3} + 0.8443)^2 + (\text{Fact4} + 0.5390)^2;$$

$$\text{Work place preference 4} = (\text{Fact1} + 0.2334)^2 + (\text{Fact2} - 0.1016)^2 + (\text{Fact3} - 0.9285)^2 + (\text{Fact4} + 0.6018)^2.$$

3. A soft skills job matching method comprising:
   asking a set of statement pairs to a potential employer or employee to determine thirteen traits;
   correlating the thirteen trait values to the mean and standard deviation of values obtained from control individuals;
   utilize a common ruler which is derived from testing a population of persons with known work place presences to achieve a consistent scale, wherein the common ruler uses the following equations:

$$\text{Factor 1} = -0.0820*\text{std\_scalar1} + 0.1311*\text{std\_scalar2} + 0.2263*\text{std\_scalar3} - 0.0058*\text{std\_scalar4} + 0.0122*\text{std\_scalar5} + 0.1248*\text{std\_scalar6} + 0.3192*\text{std\_scalar7} - 0.1720*\text{std\_scalar8} - 0.3607*\text{std\_scalar9} + 0.1148*\text{std\_scalar10} - 0.1254*\text{std\_scalar11} + 0.1085*\text{std\_scalar12} + 0.1118*\text{std\_scalar13};$$

$$\text{Factor 2} = 0.1040*\text{std\_scalar1} - 0.1211*\text{std\_scalar2} + 0.0146*\text{std\_scalar3} + 0.1113*\text{std\_scalar4} + 0.1840*\text{std\_scalar5} + 0.0314*\text{std\_scalar6} - 0.0896*\text{std\_scalar7} + 0.0293*\text{std\_scalar8} + 0.1842*\text{std\_scalar9} - 0.3991*\text{std\_scalar10} + 0.3836*\text{std\_scalar11} + 0.2279*\text{std\_scalar12} + 0.1496*\text{std\_scalar13};$$

$$\text{Factor 3} = 0.3003*\text{std\_scalar1} - 0.3337*\text{std\_scalar2} - 0.0274*\text{std\_scalar3} + 0.0810*\text{std\_scalar4} - 0.2709*\text{std\_scalar5} + 0.5507*\text{std\_scalar6} + 0.1679*\text{std\_scalar7} - 0.0377*\text{std\_scalar8} - 0.1569*\text{std\_scalar9} + 0.0920*\text{std\_scalar10} - 0.0244*\text{std\_scalar11} + 0.2408*\text{std\_scalar12} - 0.0308*\text{std\_scalar13};$$

$$\text{Factor 4} = -0.2446*\text{std\_scalar1} + 0.2927*\text{std\_scalar2} + 0.0554*\text{std\_scalar3} + 0.6769*\text{std\_scalar4} + 0.0952*\text{std\_scalar5} + 0.0175*\text{std\_scalar6} + 0.0345*\text{std\_scalar7} + 0.3185*\text{std\_scalar8} - 0.0365*\text{std\_scalar9} - 0.1329*\text{std\_scalar10} - 0.0309*\text{std\_scalar11} + 0.0301*\text{std\_scalar12} - 0.1208*\text{std\_scalar13},$$

reducing the thirteen traits to four factors by correlation;
   using a computer for transforming the four factors into work place preferences and vectors for each; and
   matching employer and employee vectors.

\* \* \* \* \*